United States Patent [19]

Rysavy et al.

[11] Patent Number: 4,929,935

[45] Date of Patent: May 29, 1990

[54] APPARATUS FOR ALIGNING RASTER SCANNED IMAGE TO TOUCH PANEL

[75] Inventors: Peter B. Rysavy; Maurice J. Fuller, both of Seattle, Wash.

[73] Assignee: John Fluke Mfg. Co., Inc., Everett, Wash.

[21] Appl. No.: 858,679

[22] Filed: May 2, 1986

[51] Int. Cl.$^5$ .............................................. G09G 3/02
[52] U.S. Cl. ..................................... 340/712; 178/18; 340/706
[58] Field of Search ............... 358/139, 148, 242, 160; 340/814, 712, 723, 724, 726, 365 C, 734, 706, 709, 711; 178/18

[56] References Cited

U.S. PATENT DOCUMENTS

| | | | |
|---|---|---|---|
| 4,035,841 | 7/1977 | Micek | 358/242 |
| 4,523,188 | 6/1911 | Huber | 340/734 |
| 4,710,758 | 12/1987 | Mussler et al. | 340/712 |

FOREIGN PATENT DOCUMENTS

| | | | |
|---|---|---|---|
| 0150903 | 8/1985 | European Pat. Off. | 358/148 |
| 0096965 | 5/1985 | Japan | 358/160 |
| 0006728 | 1/1986 | Japan | 340/712 |

OTHER PUBLICATIONS

Wolverton, Van, "Running MS DOS", 2nd Edition Microsoft Press, 1985, pp. 250-251.
Kane, Gerry, "CRT Controller Handbook", Osborne/McGraw-Hill, 1980, pp. 4-1 to 4-41.
"MC6845 CRTC", data sheet by Motorola, pp. 4-457 to 4-479.

*Primary Examiner*—James J. Groody
*Assistant Examiner*—David E. Harvey
*Attorney, Agent, or Firm*—Mikio Ishimaru; Stephen A. Becker; Israel Gopstein

[57] ABSTRACT

Apparatus for aligning a raster scanned display uses a microprocessor to control timing for horizontal and vertical synchronizing signals. An additional delay device may be provided to improve alignment resolution. When the aligning apparatus is used with a touch panel, an alignment screen is displayed, including aligning touchkeys. By depressing the touch panel at the displayed touchkeys, a user provides image position information to the microprocessor. The microprocessor corrects image alignment to the touch panel by varying timing interval counts stored in registers of a video controller for front and back porch intervals of horizontal and vertical signals. Where resolution is to be improved, delay parameter settings are provided to the additional delay device. Alternatively, the counts in the registers may be fixed and alignment may be controlled completely by the delay.

11 Claims, 2 Drawing Sheets

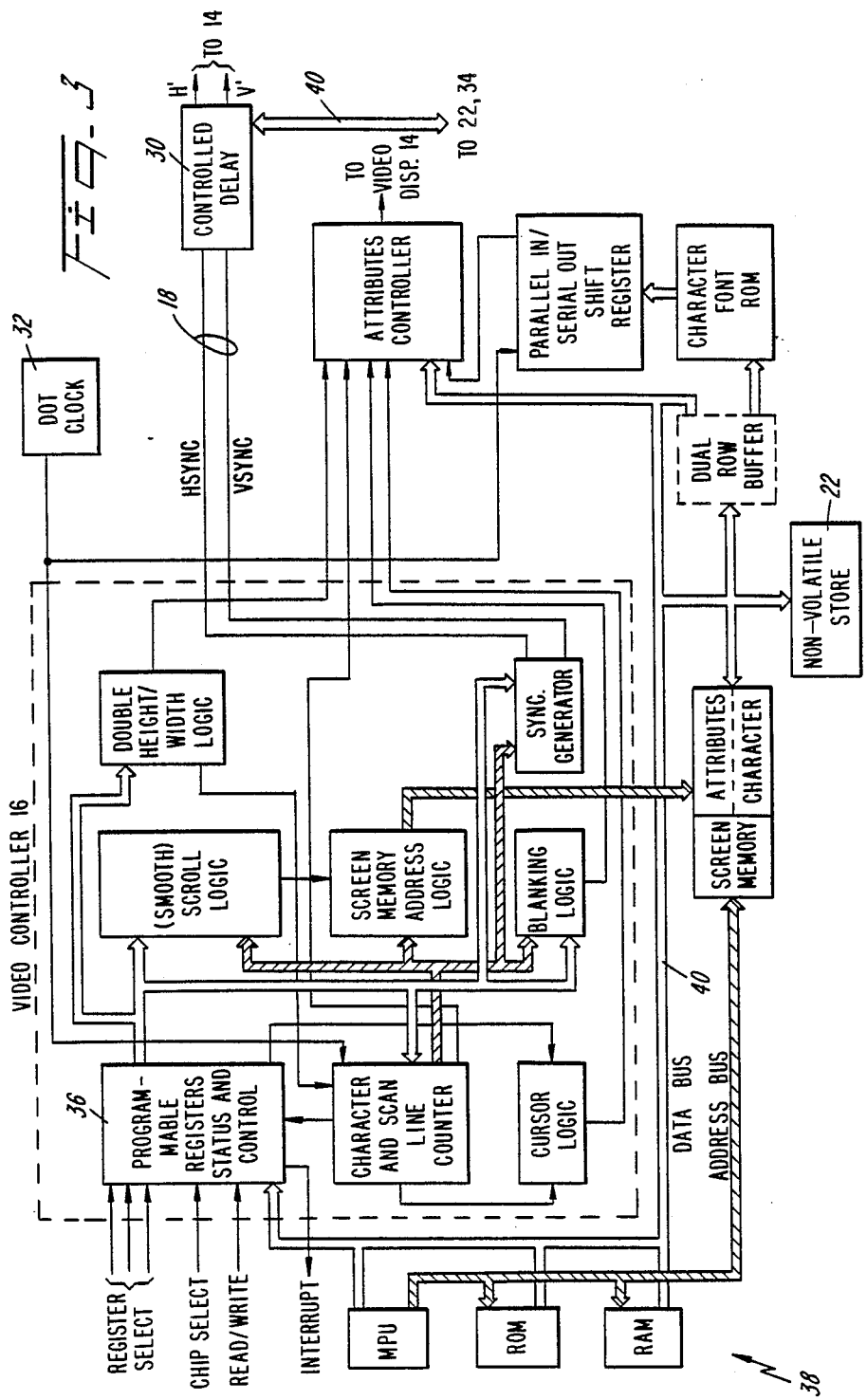

APPARATUS FOR ALIGNING RASTER SCANNED IMAGE TO TOUCH PANEL

TECHNICAL FIELD

This invention relates to display devices, and more specifically to an arrangement for aligning raster scan displays without resorting to the use of magnetic structures.

BACKGROUND ART

Many devices are known for display of data, text, and other information. One of the most widely used display devices is a raster scanned cathode ray tube (CRT), wherein an electron beam is focussed and directed onto a phosphor bearing screen by electric and magnetic fields. However, due to aging, temperature variations, differences in terrestrial magnetic field, parameter differences among similar devices, and other causative factors, the raster scan generated by similar CRT displays at different geographical locations may vary, as may the displays generated by a single device change with time.

Such variations in the raster scan of a display result in misalignment of the displayed image, and thus provide degradation of the display. The resulting image misalignment is particularly harmful when the CRT is used in conjunction with a touch control screen (TCS), wherein a touch sensitive panel is overlaid on a CRT and a user inputs signals to a computer controlled system by touching the panel at input locations, or touch keys defined by the image generated by the CRT display. In such an arrangement, misalignment of the image may result in definition of a particular input area at an erroneous location of the touch sensitive panel.

Accordingly, it is necessary to provide correction for alignment errors in a display system, and more particularly to provide misalignment correction for touch sensitive systems.

Realignment has been provided in the prior art by analog methods. One such method utilizes magnets, provided over the back of a CRT, for example, to influence the scanning beam. However, magnetic correction of misalignment suffers from the above described deficiency. That is, magnetic alignment of the display screen is inherently sensitive to the magnetic field of the earth.

Thus, since the magnetic field of the earth varies with location, a correction performed for a specific misalignment at one location may be inappropriate for the same misalignment occurring at another location. Other analog correction methods, wherein synch pulses are delayed, are inherently unstable because of parameter drift with time, temperature, tolerance variation and the like. For these reasons, a uniform realignment procedure cannot be developed for particular misalignment problems.

It is thus seen that prior art realignment techniques require a significant amount of manual skill and dexterity, resulting in increased training expenses for maintenance personnel. Moreover, once aligned, the position of a scanning beam is fixed, and cannot be readily realigned by non skilled personnel. There is accordingly a need in the prior art for realignment techniques which result in stable alignment independent of time, temperature, tolerance variation, or magnetic field, and which are thus also independent of geographical location.

There is moreover a need for realignment apparatus and techniques which may be uniformly applied to display devices, and which may be readily learned by maintenance personnel with a minimum of training.

DISCLOSURE OF INVENTION

It is accordingly an object of the present invention to overcome the difficulties of the prior art with respect to alignment of an image generated by a raster scanned display.

It is a more specific object of the invention to provide a digital method end apparatus for correction of alignment difficulties arising between a display device such as a CRT end a utilization device such as a TCS.

It is a particular object of the invention to provide a method and apparatus for alignment of a CRT to a touch control screen independently of magnetic effects, thereby to provide an alignment which is independent of geographical location, and is stable with variation of time, temperature, and other parameters affecting performance of analog components.

Yet another object of the invention is the provision of method and apparatus for alignment of a CRT display to an independently provided alignment index by variation of timing of synchronization signals generated for the CRT.

Still another object of the invention is the correction of misalignment between a CRT display and an alignment index by providing a digitally controllable delay for synchronization signals generated by a video controller, thereby to move the image displayed on the CRT in horizontal and/or vertical directions.

It is still a further object of the invention to provide a modification to a video controller wherein delays to be added to synchronization signals generated thereby, as well as register count values generated therein for timing of the . synchronization signals, are stored in a separate memory of a nonvolatile type.

In accordance with these and other objects of the invention, there is provided an improved raster scan display system. In the system, wherein a sync signal generator is provided for synchronizing the displayed image, the generator including a count register for setting a timing relationship between various portions of the sync signal, the improvement is provided as an alignment correcting means which includes a timing control for altering the timing relationship established by the register. A connecting means is provided for connecting the alignment correcting means to the sync signal generator.

In accordance with one aspect of the invention, the timing control may include a delay for delaying signals generated by the count register, which includes a count establishing circuit. Thus, at least one portion of the sync signal is varied.

Preferably, a storage facility is provided for storing the various count settings of the display system, as well as storing the delay for the generated signals.

The display device may be a CRT or any other device, such as a flat panel, which uses horizontal and vertical synchronizing signals. In such devices, digital variation of the count settings and delay settings in accordance with the invention results in horizontal and/or vertical displacement of the image, thus correcting a misalignment between the image and an external alignment index.

In one form of the invention, the raster scanned image is provided on a display having a touch control panel overlaid thereon. Alignment between the image and the panel is necessary to assure that user input via the panel corresponds to the intended input areas of the panel as indicated on the display. Thus, the alignment correcting means provides correction of such a relative alignment. The alignment correcting means includes a timing controller for alteration of the timing relationship among portions of the sync signal. The timing controller includes a delay for delaying the various signal portions and for thereby displacing the image along a corresponding direction.

BRIEF DESCRIPTION OF DRAWINGS

The foregoing and other objects, features and advantages of the present invention will become more readily apparent to those skilled in the art to which the invention pertains upon reference to the following detailed description of one of the best modes for carrying out the invention, when considered in conjunction with the accompanying drawing in which a preferred embodiment of the invention is shown and described by way of illustration, and not of limitation, wherein:

FIG. 3 shows a detailed block diagram of a typical video controller, connected in accordance with the illustration of FIG. 2.

BEST MODE FOR CARRYING OUT THE INVENTION

Figure 1:
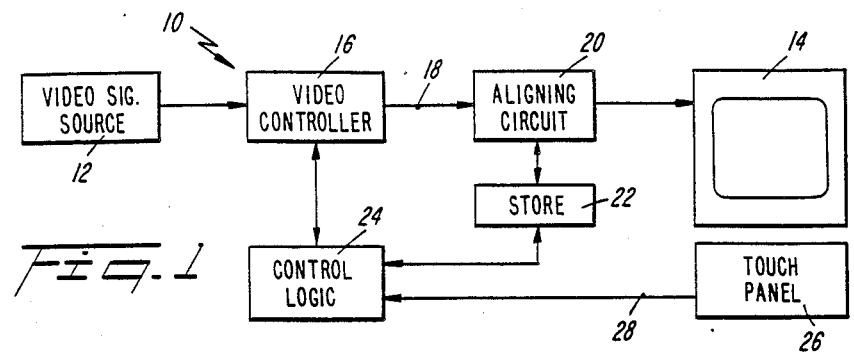
FIG. 1 shows a simplified diagram of a display system, including an alignment correction circuit of the invention.

Referring now to FIG. 1, a display system incorporating the present invention is generally shown at 10. Therein, a source of image display signals is shown at 12. The source 12 may be computer or any other image information source, such as a character generator, a video camera, or the like, as known in the art.

The image generated by the system is displayed on a display 14. While the illustrated display is shown in FIG. 1 as a CRT, the present invention is applicable to any raster scan display, and more generally to any display device wherein image position is effected by timing control of synchronizing signals.

The display system of FIG. 1 thus provides video imaging signals from the video source 12 to CRT display 14, using a video controller 16. A typical controller may access the image data and provide the same in a proper sequence with appropriate control signals, such as synchronizing signals, to the display. One such controller is available from the Signetics Corporation under the designation Advanced Video Display Controller (AVDC) SCN2674. However, the present invention is applicable to display systems utilizing other controllers as well. As is known in the art, such controllers could be embedded within VLSI chip in the form of discrete circuitry.

Controller 16 outputs to the display 14 vertical and horizontal synchronizing signals, which are of interest in the present invention. Other signals which may be affected by the controller 16 and provided to display 14 may set various attributes of the displayed image, such as size manipulation, image flashing, reverse video, cursor control and the like. As seen in FIG. 1, however, the synch signals, provided on lines 18, are not passed directly to the display.

Rather, in accordance with the invention, the synch signals are first manipulated by an aligning circuit 20 in accordance with parameters stored in a storage 22. A control logic 24, which preferably includes a microprocessor or other computer, is in communication with the video controller 16 to determine appropriate parameter settings. The microcomputer of logic 24 stores the appropriate settings to storage 22 for use in controlling aligning circuit 20. It should be recognized that the microcomputer of logic 24 may perform some of the functions of signal source 12. Such an overlap in function is not inconsistent with the present invention.

As also shown in FIG. 1, a touch panel 26, used in a manner known in the art, is associated with the video display 14. The touch panel (or other keyboard input) provides position information to the computer of control logic 24, thus identifying a selection made by a system user. Although FIG. 1 shows the same control logic 24 in control of both the aligning circuit and the touch panel operation, it is appreciated that the two functions may be performed by separate processors.

As is known in the art, touch control screen systems include a touch sensitive panel in association with a display. An image generated on the display identifies a number of touch areas, or touch keys on the touch panel with specific input codes. For example, a display may be generated requesting a user input of "yes" or "no". The generated image includes a first box having a "yes" label and a second box having a "no" label. Corresponding areas of the touch panel are identified with "yes" and "no" input codes.

Upon touching an area of the touch panel, position information is provided on lines 28 to the computer of logic 24 identifying the area, or key, touched by the user. The position of the area detected as having been touched is compared with positions of the areas of the panel identified with the specific input codes, and the significance of the user response is ascertained by the input code associated with the area touched by the user.

As previously summarized herein, for TCS operation it is necessary that the image displayed on the screen be properly positioned so that the areas of the touch panel correspond to the appropriate image areas. Even in systems utilizing a separate keyboard, however, proper alignment of an image is necessary.

Figure 2:
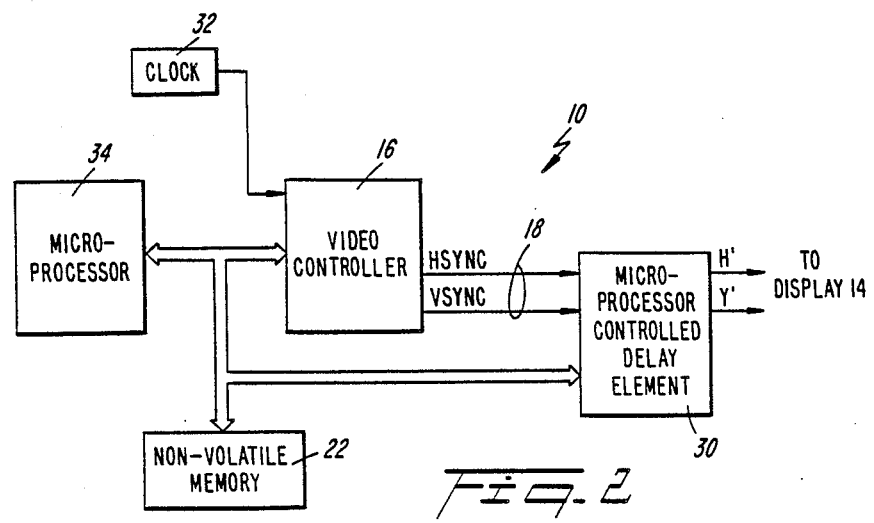
FIG. 2 shows a more detailed diagram illustrating the connection of the inventive alignment correction circuit to a prior art video controller in the system of FIG. 1.

Referring now to FIG. 2, the connection of the aligning circuit 20, store 22 and a microprocessor 34, forming part of control logic 24, to video controller 16 is shown in greater detail. A clock 32 provides appropriate timing signals to the controller.

As shown in the Figure, aligning circuit 20 may comprise a controlled delay element 30. Nonvolatile memory 22, which may be a 256 bit Electrically Erasable Programmable Read Only Memory (EEPROM) or other device, is used to store the various parameters to be provided to the controlled delay element 30 of aligning circuit 20. As will be seen upon reference to FIG. 3, video controller 16 includes a number of registers which may be used in the aligning process. EEPROM 22 stores both the settings of the registers of controller 16 and the amount of any external delay which may be provided by delay element 30 to increase resolution. Thus, store 22 is also part of the aligning circuit 20.

Of course, although an EEPROM is shown as comprising memory 22, other types of memory may be used.

For example, it will be apparent to those skilled in the art that battery backed RAM may be used, as well as optical laser disk. Moreover, it should be clear that magnetic memory such as floppy disk or bubble memory provides similar non-volatility for storage of the parameter settings.

In the arrangement of FIG. 2, the microprocessor 34 accesses the settings of the registers of controller 16 and provides the same for storage in EEPROM 22. Moreover, when the touch control system is operated in an ALIGN mode, the microprocessor 34 computes the necessary displacement of the image in horizontal and/or vertical directions, in response to user inputs via the touch panel or keyboard. Appropriate modifications in the register settings, as well as the proper delay to be added to the synch signals, are computed and sent to storage 22. The delay element, under control of the parameters stored in storage 22, provides any additional delay needed for the synch signals, thus properly aligning the image with the touch panel. Microprocessor 34, video controller 16, store 22 and delay 30 communicate via a data bus 40.

Referring now to FIG. 3, details of a generic video controller are shown in the dashed lines. A number of programmable registers are provided therein at 36, as well as other components unrelated to the present invention. Externally connected to controller 16 are a number of circuits, unrelated to the present invention. For example, a frame buffer 37 includes a screen memory and storage for various attributes of the display, as well as character storage. A dual row buffer may be provided, along with a character font ROM and a parallel-serial converting shift register. An attributes controller generally receives various signals from the controller and generates the appropriate video signals for display on CRT 14.

Of significance to the present invention are the controlled delay 30 which receives on lines 18 the horizontal and vertical synch signals generated by the controller, the programmable registers 36, and the various components 38 forming the computer 34 of control logic 24.

As seen in the Figure, the microprocessor unit MPU is connected to data bus 40 accessing the programmable registers 36 of the video controller 16. The computer of control logic 24 further includes separate ROM and RAM storage units, as known in the art, for storage of program and data. In the SCN2674 controller, the ROM and RAM also function as a synch signal memory. The computer is thus operable for providing various control signals to the video controller, and for generating appropriate image display signals for output to the video display, in a manner known in the art.

However, in the present structure, the control logic computer is further connected via data bus 40 to the nonvolatile store 22, and to controlled delay element 30, in order to provide the appropriate delay control thereto. Thus, the controlled delay 30 receives as inputs the horizontal and vertical synchronization signals, as well as the appropriate delays to be added thereto as computed by the computer 34 for enhanced resolution. Controlled delay element 30 thus delays the synch signals as directed, in accordance with the data stored in store 22, and outputs signals H' and V' to the raster scanned display 14.

The nonvolatile memory 22 is connected to data bus 40 via a pair of registers (not shown). Similarly, buffering may be provided in the connections among the attributes controller, the font ROM, and the storages therefor in frame buffer 37, and between the font ROM and the parallel/serial converter.

It should be noted that although applicants have identified a particular video controller, the circuitry provided therein may be provided as discrete integrated circuits or may be embedded within a VLSI chip. In the latter case, the circuit may not be referred to as a video controller. However, it is believed clear from the foregoing description that the particular components of the video controller are known in the art and need not be described herein in detail.

In operation, the controller includes registers which control counters determining front porch and back porch durations, as well as pulse width, for both the vertical and horizontal synchronizing signals. In the present invention, the register counts are controlled, and appropriate delays are added thereby, to increase or decrease the front porch (FP) or back porch (BP) of the horizontal synch (HSYNC) signal and the vertical synch (VSYNC) signal.

Increasing the FP and decreasing the BP of HSYNC shifts to the left the image displayed on the screen, increasing the number of blanked characters at the right side of the screen and decreasing the number of blanked characters at the left side thereof. Similarly, decreasing the FP and increasing the BP of HSYNC shifts the displayed image to the right side of the screen, increasing the number of blanked characters at the left and decreasing the number of blanked characters at the right.

In a similar manner, increasing the FP and decreasing the BP of the VSYNC signal shifts the image towards the top of the screen, by increasing the number of blanked scan lines at the bottom of the screen and decreasing the number of blanked lines at the top thereof. On the other hand, decreasing the FP of VSYNC and increasing the BP of VSYNC shifts the image towards the bottom of the screen, decreasing the number of blanked scan lines at the bottom of the screen and increasing the number of blanked lines at the top.

In the SCN2674 video chip, for example, the manufacturer identifies registers IR1, IR2, IR3 and IR7 as storing count data identifying the various interval lengths of the HSYNC and VSYNC pulses. Thus, register IR1 stores a count setting the front porch for the HSYNC pulse, while IR2 stores counts setting the back porch of HSYNC and the width of the HSYNC pulse. IR3 stores the FP and BP counts for VSYNC, while IR7 stores a count indicating the width of VSYNC.

Microprocessor 34 is connected for changing the contents of the various registers of the video controller, thus varying the FP, BP, and pulse width of one or both of HSYNC and VSYNC. As described above, such variation results in displacement of the image on the screen, and provides the proper alignment for the image as described below. However, it is noted that in the registers used in the above identified chip, vertical front porch variations are provided in 4 scan line increments, so that 4 scan line resolution is provided thereby. Since such a resolution is insufficient for TCS application contemplated herein, external controlled delay element 30 is provided, for providing selective delays equivalent to 0, 1, 2 or 3 scan lines.

Accordingly, by changing the register contents and by providing the additional delay, as necessary, the present invention provides one scan line resolution for vertical alignment. A similar problem is overcome in the horizontal resolution by adding an appropriate one character delay, if needed. The prior art video controller provides only a two character resolution. The external delay element is thus used to increase the level of resolution to one character, in a manner similar to that described for vertical resolution.

As previously noted, the present improvement is particularly helpful in aligning CRT displays to a touch panel. However, the improvement described herein is similarly applicable for aligning and shifting image displays which are not used in conjunction with touch panels. In the preferred embodiment, the touch panel is scanned under control of the microprocessor 34 though the particular no part of the present invention.

In the illustrative embodiment described herein, a resistive membrane touch panel is used, although other technologies may be utilized. Microprocessor 34 continuously scans the touch panel. Upon deteCtion of a touch, the control software for microprocessor 34 determines the touch area, or key which was pressed in a standard manner.

Preferably, the delay element described above is a PAL, programmed as a finite state machine, clocked by the character clock. Of course, any delay logic may be used, including logic embedded within a VLSI IC. The amount of delay provided thereby is controlled by three bits from registers under microprocessor control. Two bits are used to form a binary code specifying the amount of delay to be provided for the VSYNC pulse, i.e., 0, 1, 2 or 3 scan lines, and a single bit code is used to specify the amount of horizontal delay, i.e., 0 or 1 character. Of course, other display controllers, having different resolution limits, may require more or fewer bits to control the delay. A controller having register counts which provide one scan line and one character resolutions vertically and horizontally, respectively, may thus be aligned without use of the external delay element. Alternatively, if the register contents of the controller are fixed, such as for image position at topleft most corner, all further alignment may be achieved by using only the external delay, independently of the controller.

To implement the present invention, a user causes the TCS to enter the ALIGN mode by touching a particular touchkey which may be offered in a setup screen menu, for example. Alternatively, the system may be provided with a separate setup, or ALIGN, button provided on a rear panel of the display system or with a particular keyboard input sequence, e.g., "shift/A", to activate the ALIGN mode. Once having entered the ALIGN mode, a particular image is generated for display on the CRT. The image, shown in FIG. 4, includes a number of touch areas, or keys 42, at the ends of a cross hair display 44.

The user touches the panel at the four areas over the four keys 42. By standard software operation, the microprocessor 34 determines the regions of the touch panel 26 which were pressed by the user. A simple computation, such as subtraction, may be used to determine the differences between the actual positions of the four keys in the respective horizontal and vertical directions and the desired positions thereof. Upon determining the misalignment between the actual image and the properly aligned image, microprocessor 34 corrects the contents of the registers 36, and provides an appropriate delay value to storage 22. The procedure may be repeated, if necessary, in view of the finite areas occupied by the touchkeys.

Figure 4:
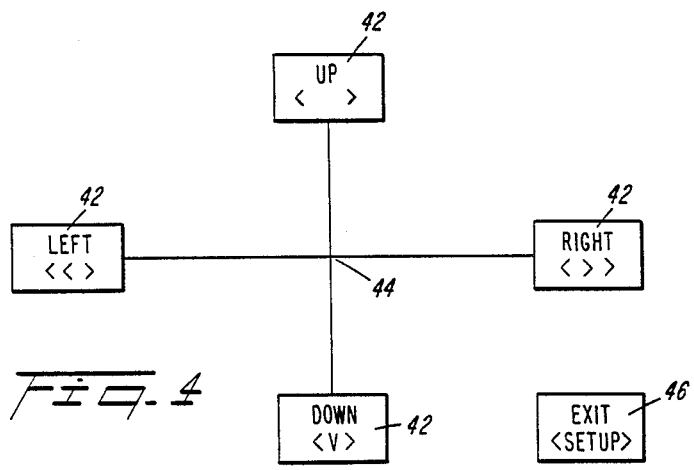
FIG. 4 shows a display image generated by a Touch Control System operating in an ALIGN mode in accordance with the invention.

Preferably, alignment indicia are provided on a bezel surrounding the display. In the align mode, the "cross hair" display of FIG. 4 is generated upon appropriate input from the touch panel or the keyboard, the display is shifted horizontally and/or vertically until the cross hair areas 42 align with the bezel.

Upon completion of the alignment procedure, the user again touches the panel, at touchkey 46, to exit the ALIGN mode and to reenter the SETUP screen. Upon pushing a SAVE key or "shift/S" on the keyboard, the appropriate alignment parameter settings are stored in storage 22, for use until modified by the next use of the ALIGN mode.

The foregoing description of the preferred embodiment of the invention has been presented for purposes of illustration and description and is not intended to be exhaustive or to limit the invention to the precise forms disclosed, since many modifications and variations are possible in light of the above teaching. The embodiment was chosen and described in order best to explain the principles of the invention and its practical application, thereby to enable others skilled in the art best to utilized the invention in various embodiments and with various modifications as are suited to the particular use contemplated therefor. It is intended that the scope of the invention be defined by the claims appended hereto, when interpreted in accordance with full breadth to which they are legally and equitably entitled.

We claim:

1. In a display system having a raster scan display having a touch control screen means overlaid thereon and a synchronizing signal generating means for generating a synchronizing signal for synchronizing an image displayed on said raster scan display, said touch control screen means including a touch sensitive panel over said raster scan display, said synchronizing signal generating means including count registering means for establishing a timing relationship among portions of said synchronizing signal generated thereby and count establishing means for establishing counts for said registering means to define durations of front and back porch portions and of a synchronizing pulse portion of said synchronizing signal, the improvement comprising:
    (a) alignment correcting means in said display system for correcting misalignment of the image displayed thereby relative to said touch control screen means,
    (b) said alignment correcting means including timing control means for altering said timing relationship established by said count registering means,
    (c) said timing control means including delay means for delaying said synchronizing signal to displace said image along a scan direction synchronized thereby, and
    wherein said alignment correcting means further includes means for generating an alignment screen for display on said raster scan display, said alignment screen including display areas representing keys for activation by a user, said keys identifying vertical and horizontal alignment indices, said alignment correcting means further including means for determining keys activated by the user and providing delay data to said delay means.

2. An improved display system as recited in claim 1 further comprising storage means for storing delay settings for said delay means.

3. An improved display system as recited in claim 2 wherein said storage means is further operable for storing counts established by said count establishing means.

4. An improved display system as recited in claim 1 further comprising storage means for storing counts established by said count establishing means.

5. In a display system including a raster scan display and a synchronizing signal generating means for generating a synchronizing signal for synchronizing an image displayed on said raster scan display, a touch control screen means including a touch sensitive panel over said raster scan display and location means for determining location of touch keys activated by the user, said synchronizing signal generating means including count registering means for establishing a timing relationship among portions of said synchronizing signal generated thereby and count establishing means for establishing counts for said registering means to define durations of front and back porch portions and of a synchronizing pulse portion of said synchronizing signal, the improvement comprising:

alignment correcting means in said display system, including means for generating for display on said raster scan display an alignment screen, said alignment screen defining a plurality of discrete touch key means of said touch control screen means for correcting misalignment of the displayed alignment screen relative to said touch control screen means, said defined touch key means respectively operating upon activation by a user for providing respective instructions to said count establishing means for varying respective ones of said counts established thereby for said registering means to displace said displayed alignment screen in a respective predetermined direction in accordance with the respective one of said defined touch key means activated by the user.

6. A method for aligning an image displayed by a display system having a raster scan display, a synchronizing signal generating means for generating a synchronizing signal for synchronizing images displayed on said raster scan display, a touch control screen means including a touch sensitive panel over said raster scan display and location means for determining location of touch keys activated by the user, said synchronizing signal generating means including count registering means for establishing a timing relationship among portions of said synchronizing signal generated thereby and count establishing means for establishing counts for said registering means to define durations of front and back porch portions and of a synchronizing pulse portion of said synchronizing signal, and means for generating an image for display on said raster scan display, said image defining a plurality of discrete touch key means for identifying to said location means locations thereof, comprising the steps of:

(a) generating for display a screen which includes aligning indicia and which defines a plurality of discrete touch keys for said touch control screen means, (b) determining misalignment between at least one of said aligning indicia and a predetermined corresponding locator indicium therefor, (c) activating one of said plurality of discrete touch keys of said touch control screen means in accordance with the determined misalignment thereby to provide an instruction to said count establishing means to change a count established thereby for said registering means, and (d) varying in a predetermined direction a count of a registering means corresponding to the activated one of said touch keys in accordance with the activated one of said plurality of discrete touch keys of said touch control screen means, (e) thereby displacing said generated screen in said predetermined direction and reducing the misalignment determined at step (b).

7. The method for aligning recited in claim 6 comprising the further steps of repeating said steps (b) through (e) until misalignment between said aligning indicia and said locator indicium is below a predetermined threshold.

8. The method for aligning recited in claim 7 comprising the further step of activating an exit-key provided as one of said plurality of discrete touch keys of said touch control screen means, thereby terminating the alignment method and clearing the screen.

9. The method for aligning recited in claim 6 comprising the further steps of:

storing the count varied in said step (d) in a non-volatile storage means, and providing the stored count from said non-volatile storage means to said registering means.

10. In a display system for generating a raster scan display, having a user input means and a synchronizing signal generating means for generating a synchronizing signal for synchronizing an image displayed on said raster scan display, said synchronizing signal generating means including count registering means for establishing a timing relationship among portions of said synchronizing signal generated thereby and count establishing means for establishing counts for said count registering means to define a timing relationship among portions of said synchronizing signal, the improvement comprising:

said user input means including key means comprising a touch control screen means over said display, means for generating for display on said raster scan display an alignment screen including therein a plurality of indicia for indicating an alignment of the generated screen relative to predetermined orientation and displacement, location means responsive to ones of said key means operated by a user for correcting misalignment of the displayed alignment screen relative to said predetermined orientation and displacement, said location means including said count establishing means operable responsively to said said user operated key means to displace said displayed alignment screen in a respective predetermined direction in accordance with a respective one of said alignment key means operated by the user, by varying respective one of said counts.

11. The improved display system of claim 10, wherein said alignment screen comprises touch keys generated by said display system for said touch control screen means.

* * * * *